United States Patent [19]

Borenson

[11] Patent Number: 4,713,009

[45] Date of Patent: Dec. 15, 1987

[54] TEACHING APPARATUS AND METHOD FOR SOLVING ALGEBRAIC LINEAR EQUATIONS

[76] Inventor: Henry Borenson, 1469 Neshaminy Valley Dr., Bensalem, Pa. 19020

[21] Appl. No.: 872,845

[22] Filed: Jun. 11, 1986

[51] Int. Cl.$^4$ .................... G09B 19/02; G09B 23/02
[52] U.S. Cl. .................................. 434/188; 434/200; 434/207; 434/208
[58] Field of Search ............... 434/188, 194, 190, 191, 434/192, 193, 195, 207, 208

[56] References Cited

U.S. PATENT DOCUMENTS

| | | | |
|---|---|---|---|
| 3,235,975 | 2/1966 | Pierson | 434/208 X |
| 3,453,748 | 7/1969 | Miller | 434/207 |
| 3,514,873 | 6/1970 | Stobbe | 434/190 |
| 4,452,588 | 6/1984 | Smith | 434/208 X |

FOREIGN PATENT DOCUMENTS

| | | | |
|---|---|---|---|
| 597615 | 9/1925 | France | 434/208 |
| 199206 | 1/1939 | Switzerland | 434/200 |

Primary Examiner—William H. Grieb
Attorney, Agent, or Firm—Gregory J. Gore

[57] ABSTRACT

A teaching apparatus for Mathematics, specifically algebraic concepts for very young children enables 3rd and 4th grade level students to solve simple linear algebraic equations. The apparatus includes easily manipulated elements which serve as cognitive reinforcement during the learning process. These physical elements are used in conjunction with a set of rules or "legal moves". The apparatus and corresponding legal moves determine a physical model and physical process to represent both an algebraic linear equation and its algebraic solution. A simple physical element, such as a pawn, is used to denote the unknown quantity. Numbered cubes are used to represent numerical values. These elements are color coded to represent both positive and negative values of the quantities represented. By the use of this apparatus and associated legal moves, students learn to simplify a given linear algebraic equation to the point where the solution or value of the unknown quantity is intuitively obvious.

10 Claims, 5 Drawing Figures

$$2X + * + 3 = 2 * + 15$$

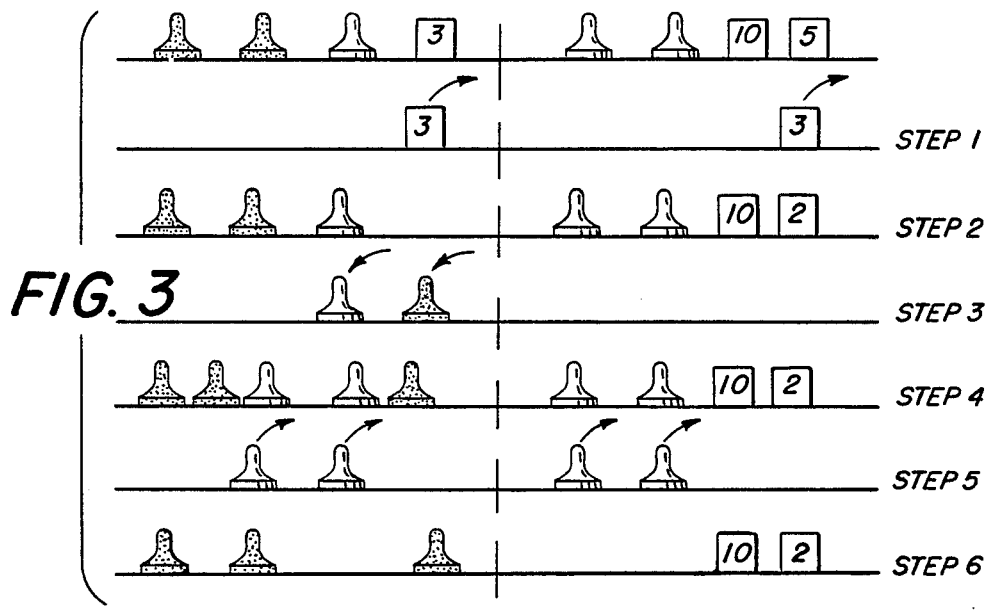
FIG. 3
$$2(X-1) + 4 * = X + (-8)$$
FIG. 4
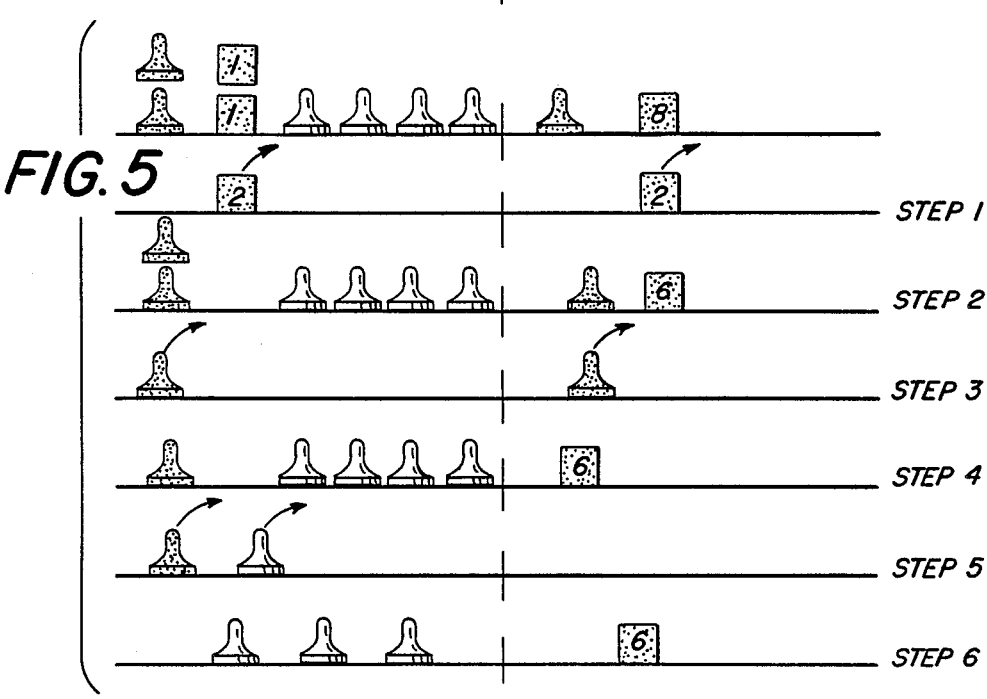
FIG. 5

TEACHING APPARATUS AND METHOD FOR SOLVING ALGEBRAIC LINEAR EQUATIONS

FIELD OF THE INVENTION

This invention relates to educational aids for Mathematics and to a device for solving algebraic linear equations in particular. An apparatus has been designed which makes possible the teaching of basic algebraic concepts to very young children.

BACKGROUND OF THE INVENTION

Because our society continues to expand in the area of science and high technology, the teaching of science-related courses is more important than ever. Complimenting this appreciation for the need of training in the sciences, such as Mathematics, is the recent discovery that children are able to grasp complicated concepts at a much earlier age than has ever before been thought possible.

To take advantage of both of these factors, a special apparatus needs to be devised so that at the beginning learning stages children will have a physical model which will enrich the learning process. It is also important that this learning model will be both manipulative, as well as visual, to be most effective. In this way, the teaching apparatus can be an "object to think with" or "a transitional object" in the learning of Mathematics.

One of the most important areas of Mathematics is algebra. It has been discovered that by using the apparatus of the present invention, elementary school children can learn basic algebraic concepts and the methods of solving algebraic equations once thought only appropriate for the 9th grade level. This apparatus and the teaching methodology that accompanies it thus constitutes an educational innovation.

By using the instant device, 3rd and 4th graders can easily solve such equations as $$2X+X+X+2=2X+10, \quad 2X+(-X)+3=(-X)+15,$$
$$\text{and } 2(X-1)+4(-X)=X+(-8).$$

That 3rd and 4th graders can solve such equations at all is a tribute to the power available to students when an abstract concept is presented through a physical model that they can readily grasp and manipulate. The present invention provides an accessible "hands-on" learning system for algebraic linear equations for elementary schoolage children. The students simply "set up" a given algebraic equation using pawns and cubes and then proceed with physical ease to carry out various rules for moving the pawns and cubes, called "legal moves", and thereby solve the given equation.

Accordingly, it is an object of the present invention to create an educational aid for teaching basic algebraic concepts.

It is a further object of the present invention to provide an apparatus and method for teaching young children how to solve simple linear algebraic equations.

Other objects of the present invention are to provide a learning system for algebra that (a) makes the subject easy for students to learn, (b) provides children with tremendous sense of mathematical power and self-confidence, (c) bolsters students' mathematical interest, (d) lays a concrete, intuitive foundation of what equations are all about, and (e) provides an important step in improving Mathematics education for students in the United States so that their achievement is the best in the world.

SUMMARY OF THE INVENTION

In accordance with the present invention, there is provided a reference balance, two (2) sets of pawns (each set of a different color), and two (2) sets of numbered cubes. The balance apparatus, which only defines a reference point for two sides of an equation, does not have any moving parts—instead, it is always in physical balance regardless of the pieces placed on each side of the scale. The balance serves primarily as a cognitive reinforcement that every equation has two sides which, during all steps in the solving process, must remain "equal", "the same", or "in balance".

The sets of pawns are used to denote unknown quantities. The two different colors differentiate between pawns of opposite value, i.e. pawns having the same numerical value but opposite signs. Numbered cubes are used to provide a familiar, easily manipulated object which may be displayed to represent a given numerical value. The numbered cubes are also in two (2) sets having two different colors, one for positive values and one for negative values. The simplicity of this apparatus belies its sophistication as a teaching tool.

These structures are combined with a teaching methodology whereby students are taught to physically represent algebraic linear equations and then to solve them through a variety of physical "legal moves" which make concrete many of the traditional, abstract techniques for solving algebraic linear equations. Students are taught to move the various pieces of the apparatus according to these legal moves. It is this specific use of the pawns and cubes that makes a workable "calculator" for solving algebraic linear equations. This device is similar to the classical abacus. This new abacus, however, is a device by which third and fourth grade students can solve algebraic linear equations, an achievement which has never been done before.

The above objects and brief description of the present invention will be more fully understood and further objects and advantages will become apparent from a study of the following description in connection with the drawings herein.

BRIEF DESCRIPTION OF THE DRAWINGS

FIG. 3 shows a step-by-step process for moving these pawns and cubes to simplify and solve the given equation.

FIG. 4 shows a "setup" for equation $2(X-1)+4(-X)=X+(-8)$.

FIG. 5 shows a step-by-step movement of the pawns and cubes to arrive at the answer.

DESCRIPTION OF THE PREFERRED EMBODIMENT

Figure 1:
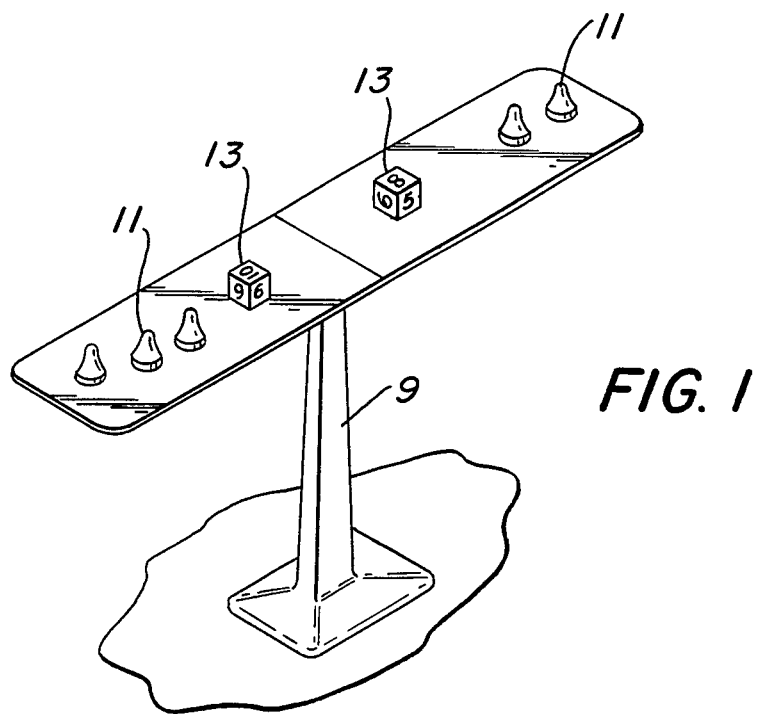
FIG. 1 is an isometric view of the balance which may be used as a demonstration platform for group teaching.

In the preferred embodiment of the present invention, a large fixed balance 9 as shown in FIG. 1 is used to teach the notion that all equations have two sides which must always be in balance. The balance structure also serves as a demonstration platform for group teaching. For individual student work, the "balance" may take the form of a paper on which a picture of a balance is printed.

After more experience with this system, children can create their own balance with paper and pencil by drawing lines as in FIGS. 2-5. In this way, all physical objects can be eliminated at an advanced level in the learning process.

Simple pawns 11 or other markers are used to denote unknown quantities and numbered cubes 13 are used to represent numerical values. The pawns and cubes are placed on the balance, whether demonstrated to a group on a physical balance or done individually by the student on a printed paper balance, to represent a given algebraic equation.

All pieces on each side of the balance are associated by the concept of simple mathematical addition, as would be the case with weights on a scale. For example, a numerical cube with the numeral 5 facing upward next to a pawn which represents an unknown quantity, such as the classic "X", would represent the expression "X+5".

The concept of multiplication of an unknown quantity by an integral constant is represented by a repetition of the representational item for that unknown quantity. Therefore, three pawns, while representing "X+X+X", is also understood to represent "3X", because it is a repetition of the representational item for "X" three times. Likewise, the multiplication of an algebraic expression by a constant is represented by a repetition of the representational items for that algebraic expression. Repetitive clusters may be arranged in parallel lines to better show repetition of identical elements. Therefore, two rows, each consisting of three pawns and a 5-cube, is understood to represent "2(3X+5)", because it is a repetition of the representational items for "3X+5" two times.

The concept of subtraction of an algebraic or numerical expression is accomplished by the removal from the reference line of the representational items for that expression. If those representational items do not occur on the reference line, the called-for subtraction can still be carried out after first placing those representational items, as well as their opposites, on the reference line. Since an algebraic or numerical expression and its opposite are worth zero, this process of placing opposites on the reference line does not change the value of what is already on that reference line but it does make possible the necessary subtraction. For example, to represent "5−X", the student places a "5" on the reference line. He then places next to that "5" a pawn representing "X", and another pawn of a different color representing "−X". Then, by removing the pawn which represents "X", the student has left a physical representation for "5−X". (Importantly, the student also has left a physical expression which represents "5+(−X)", as would be expected if the system were algebraically valid since in algebra, a−b=a+(−b).)

The children are taught the concept of an equation through its corresponding physical "setup" wherein legal moves are employed which do not disturb the balance of the setup. In a series of lessons, the students are taught that removing the same number and kind of pawns, or the same value on the cubes, from each side of the balance is a legal move. Other legal moves include: adding the same number and kind of pawns, or the same value on the cubes, to both sides of the balance; adding a pair of opposite pawns (pawns of opposite color), or again of opposite cubes (cubes of the same numerical value but of opposite color), to either side of a setup; removing a pair of opposite pawns or opposite cubes from either side of a setup. Students are taught that a pawn of a second color can neutralize or cancel a pawn of the first color in a 1—1 relationship. Likewise, a cube of a second color, but having the same numeric value, when combined with the cube of the first color, cancels it.

All of these legal moves are physical counterparts to important algebraic properties, such as the subtraction property of equality, the addition property of equality, the addition property of zero, and the property of additive inverses. Hence, this invention and the corresponding legal moves determine a physical model and physical process to represent both an algebraic linear equation and its algebraic solution.

Figure 2:
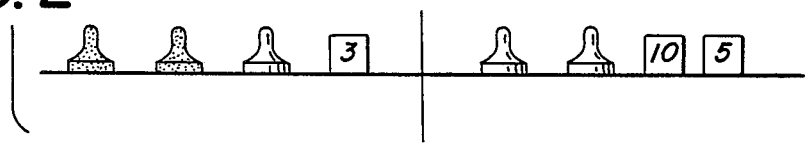
FIG. 2 shows a "setup" for the equation $2X+(-X)+3=2(-X)+15$.

FIG. 2 shows a "setup" for the equation $2X+(-X)+3=2(-X)+15$. FIG. 3 shows a step-by-step process for moving these pawns and cubes to simplify and solve the given equations. FIG. 4 shows a "setup" for the equation $2(X-1)=4(-X)=X+(-8)$. FIG. 5 shows a step-by-step movement of the pawns and cubes to arrive at the answer. The direction of the arrows in the figures indicates where pawns or cubes have been either removed or added to the setup.

In FIG. 3 the step 1 of the solution process involves removing the numerical value of 3 from both sides of the equation. This is indicated in step 1 and yields the result shown in step 2. In step 3 two markers, one of each color, is added to the left side of the setup. This leaves the result as shown in step 4. In step 5 four markers of the same color are removed from the setup, two from each side. This leaves the result as shown in step 6. At this point we have three markers of the same color on the left side of the equation and the value 12 on the right. Students are then asked if they know 3 times what value equals 12. And the answer of 4 is therefore intuitively obvious. One can check this answer with the initial given equation to verify that the solution is correct.

FIG. 5 shows step-by-step solution of the given equation of FIG. 4 which is more complicated. In step 1, the negative 2 cube is removed from both sides. This yields the resulting setup of step 2. In step 3, one negative marker is removed from each side which results in the setup of step 4. In step 5, a pair of markers, one positive and one negative, is removed from the lefthand side leaving the resulting setup as shown in step 6. From here it can be seen that three positive markers equals positive 6, or one marker would then intuitively equal 2 and the solution to this equation is intuitively obvious as X=2. A check of the original equation as shown in FIG. 4 will verify that this is the correct solution.

The facility of this manipulative system is greatly enhanced by the use of the number-cubes which enable students to quickly assess and change the numerical value of the constants on either side of the balance. Furthermore, the distinct shapes used to represent variables and constants enable the student to quickly learn to discern between "legal moves" performed on the variables, and "legal moves" performed on the constants.

It should be understood that there are many modifications and adaptations to the embodiment of the invention outlined herein which still fall within the scope and spirit of the invention. It is not, therefore, intended that the specific embodiments described herein be a limitation upon the scope of the invention which shall be determined by the appended claims and their legal equivalents.

What is claimed is:

1. A device for solving a given linear algebraic equation, comprising:
   (a) a reference line which has an indicated center point for the purpose of giving the cognitive impression of balance,
   (b) a plurality of markers, each marker representing a unit amount of an unknown quantity,
   (c) a plurality of numbered cubes for representing numerical values whereby said markers and cubes are arranged in clusters on both sides of said center point to represent said equation and thereafter rearranged according to rules of movement in order to simplify said equation until the value of the unknown quantity is obvious, said markers, cubes, reference line, and center point, being the only articles used for representing elements of said equations without any indicator means for representing mathematical operations.

2. The apparatus of claim 1 further described in that said markers are divided into two groups being differentiated by color to denote markers of the same unknown value but of opposite signs.

3. The apparatus of claim 2 further described in that said numbered cubes are divided into two groups, each group being differentiated by color, representing positive and negative value.

4. The apparatus of claim 3 wherein said reference line is located on a demonstration platform supported by a pedestal that visually looks like a large weight balance.

5. The apparatus of claim 3 wherein said reference line is printed or hand drawn on a piece of paper.

6. The method of solving an algebraic equation using the apparatus of claim 3 and comprising the steps of:
   (a) placing said markers and cubes along said reference line according to rules of placement so as to provide a physical representation of a given linear equation, and
   (b) adding to, or removing from, said reference line markers or cube values according to a set of rules of movement until the number or kind of markers and cubes remaining on said reference line is reduced so that the value of an unknown quantity is intuitively obvious.

7. The method of claim 6 wherein said set of rules of movement comprise the following:
   (a) the same number and kind of pawns or the same value on the cubes may be added to both sides of said reference line,
   (b) the same number and kind of pawns or the same value on the cubes may be removed from both sides of said reference line,
   (c) a pair of pawns of different colors or a pair of cubes of the same numerical value but of different colors may be added to either side of said reference line, and
   (d) pair of different color pawns or different color cubes may be removed from either side of said reference line.

8. The method of claim 6 wherein said reference line is located on a demonstration platform supported by a pedestal which as the appearance of a weight balance.

9. The method of claim 6 wherein said reference line is printed or hand-drawn on a piece of paper.

10. The method of claim 6 wherein said rules of placement comprise the following:
    (a) representational items for the left side of the algebraic equation are placed on the left side of the reference line, and similarly for the right side,
    (b) representational items for an algebraic expression which is multiplied by an integral constant are represented only by repetition on the reference line as many times as the value of the constant,
    (c) representational items of an algebraic expression which are to be added are represented only by placement next to each other on the reference line, and
    (d) representational items of an algebraic expression which are to be substracted are removed from the reference line; if necessary, the representational items and their opposite represented by the same item of a second color are first added to the reference line to allow for the removal of some of said representational items.

* * * * *